June 7, 1960   R. W. COOK   2,939,608
MATERIAL-METERING MECHANISM
Filed Nov. 14, 1955
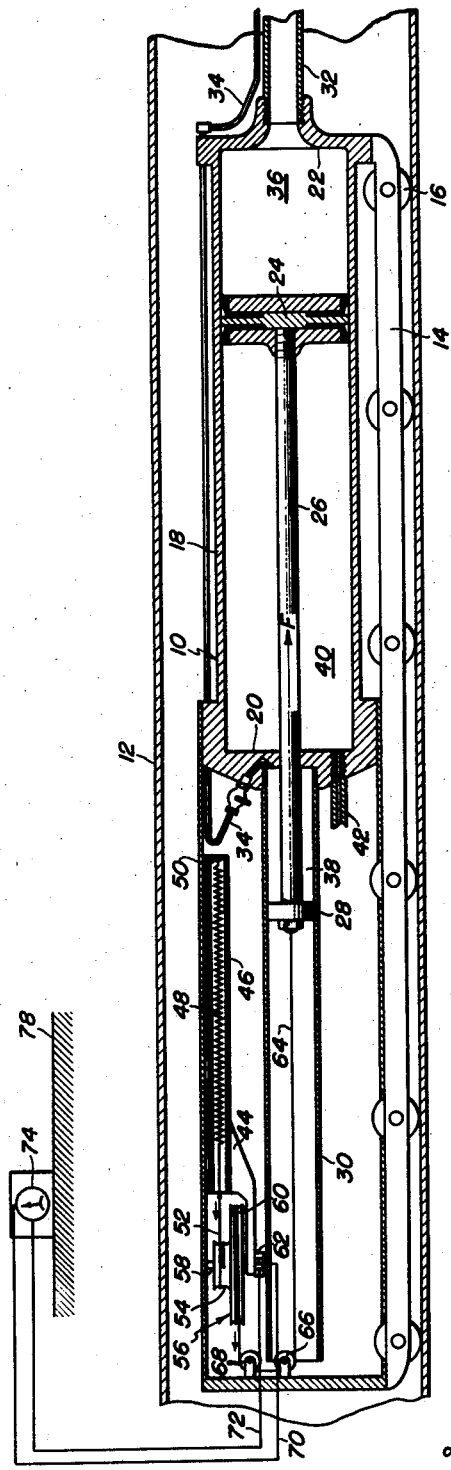
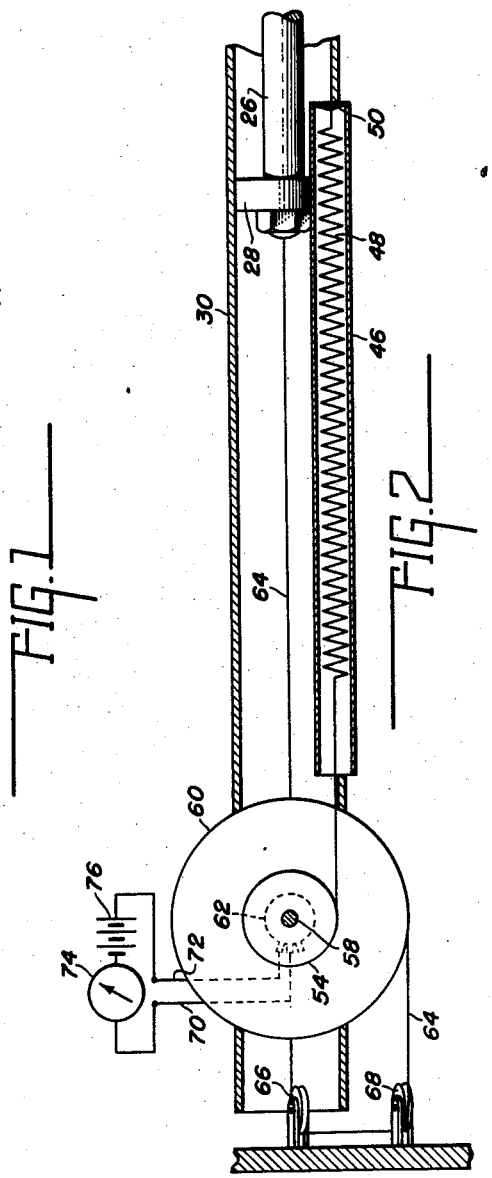
INVENTOR.
ROBERT W. COOK
BY
Lockwood, Galt, Woodard, & Smith
ATTORNEYS United States Patent Office 2,939,608
Patented June 7, 1960

2,939,608

MATERIAL-METERING MECHANISM

Robert W. Cook, Decatur, Ind., assignor to Charles W. Fuelling, Fort Wayne, Ind.

Filed Nov. 14, 1955, Ser. No. 546,709

4 Claims. (Cl. 222—41)

The present invention relates to material-metering mechanism, and more particularly to a mechanism for applying a measured quantity of plastic material to the interior surface of an underground gas main.

In the gas industry, underground mains and pipelines are used for conducting gas from reservoirs to places of consumption. Gas mains vary in size from diameters of two (2) inches up to diameters of four (4) feet, the majority of these mains having been laid many years ago. The mains consist of many pipe sections which are joined together by means of bell and spigot joints, each joint being sealed with suitable material such as jute. Because of the drying effect of the natural gas, the jute becomes dry and later deteriorates so that today the joints are badly leaking and in need of resealing.

In Cook et al. application Serial No. 473,402, filed December 6, 1954, apparatus and method for coating pipeline joints from the interior of the pipeline are disclosed and claimed. In general, the method comprises the steps of digging a hole to the underground main, forming a hole in the main, introducing a pipe-coating and joint-locating apparatus through the hole, and then sequentially locating and coating joints by unidirectionally moving the apparatus through the pipeline. The steps of this method are controlled from the surface of the ground at a point quite remote from the location of the apparatus in the underground main.

Since the entire operation of coating the individual joints is carried on without the benefit of visual observation, it is nevertheless necessary to know just exactly what the apparatus is doing inside the main. For example, in order to properly seal a joint, it is necessary that at least a certain quantity of sealing material be applied to the joint. It is this matter of applying a measured quantity of sealing material to a joint with which this invention is primarily concerned.

It is therefore an object of this invention to provide an apparatus for measuring the amount of material which is applied to a pipe joint or the like.

It is another object of this invention to provide an indicating device which registers the amount of material discharged by the apparatus onto the internal wall of the gas main.

Other objects will become apparent as the description proceeds.

To the accomplishment of the above and related objects, my invention may be embodied in the forms illustrated in the accompanying drawings, attention being called to the fact, however, that the drawings are illustrative only and that specific change may be made in the specific constructions illustrated and described, so long as the scope of the appended claims is not violated.

In the drawings:

Fig. 1 is a longitudinal sectional view of an embodiment of this invention shown in position in an underground gas main; and Fig. 2 is an enlarged sectional view of a portion of the embodiment of Fig. 1 rotated at an angle of ninety (90) degrees.

Referring to the drawings, a joint-coating machine 10 is shown as being positioned for operation inside an underground gas main 12 which is of conventional construction and composed of a plurality of pipe sections joined together by bell and spigot joints. It is these joints with which this invention is primarily concerned.

The machine itself is essentially identical in almost every respect to the apparatus disclosed in Cook et al. application Serial No. 473,402, filed Dec. 6, 1954, now Patent No. 2,894,539 of July 14, 1959, so that any details of construction necessary to a more detailed understanding of this invention may be found in this prior application which, for disclosure purposes, may be considered as incorporated herein.

The machine comprises a carriage 14 provided with wheels 16 which ride on the bottom of the pipeline 12. On the carriage is mounted a storage cylinder 18 having opposite end closure plates 20 and 22. A piston 24 is reciprocably received by the cylinder and is secured to a piston rod 26 which extends through the closure 20 in fluid-tight relationship to be secured to a smaller piston 28 in a correspondingly small auxiliary storage cylinder 30. It will be noted that the smaller cylinder 30 is coaxially threaded into the closure plate 20.

Extending forwardly from the plate 22 is a tubular supporting post 32 which carries upon its distal end rotary blades (not shown) which serve in applying plastic material to the interior of a pipeline. Details of construction of these blades are illustrated and described in the aforementioned Cook et al. application.

Communicating with the forward end of the cylinder 30 is a conduit 34 which extends forwardly in parallel relation with the post 32.

Plastic material of desired characteristics is stored in the chamber 36 ahead of the piston 24, and a catalyst for mixing with this plastic material is contained in a chamber 38 ahead of the piston 28. Upon movement of the two pistons 24 and 28 in the direction of the arrow F, plastic material and catalyst or accelerator will be exuded or discharged from the two chambers 36 and 38 respectively, and thence through the post 32 and conduit 34. These materials are mixed at the distal end of the post 32 and thereafter applied directly to the pipeline wall. Exact details of this mixing arrangement may be found in Gallmeyer application Serial No. 538,936, filed October 6, 1955.

Movement of the two piston 24 and 28 is effected by means of air pressure which is introduced into the cylinder chamber 40 by means of an inlet line 42 which may extend for a considerable distance to be connected to a source of air pressure which is located on the surface of the ground. By operating a valve on the surface of the ground which is interposed in the line 42, the communication of either superatmospheric or sub-atmospheric pressure to the chamber 40 for causing either protractile or retractile movement of the piston 24 may be easily accomplished. By admitting super-atmospheric pressure to the chamber 40, the piston 24 as well as the piston 28 will be driven forwardly in the direction of the arrow F for discharging plastic material.

Since the amount of material discharged from the chamber 36, for example, is directly dependent upon the degree of movement of the piston 24, it is thereby possible to determine the amount of material discharged by measuring piston travel. This measurement is accomplished by the mechanism now to be described.

Mounted on suitable framework 44 which is operatively carried by the carriage 14 is a rigid tube or the like 46 inside of which is disposed a tension spring 48. This spring is connected at one end to the end 50 of the tube 46 and at the other end is connected to a cable 52 adapted to be wound on a drum 54 of a rotary assembly 56. This assembly 56 comprises a shaft 58 suitably journalled in the framework 44, the small drum 54 and a larger drum 60 being secured for rotation with this shaft. A variable resistor or potentiometer 62 of conventional design is preferably mounted on the framework 44 and is operatively secured to the shaft 58. The stator portion of the resistor 62 is secured in some suitable manner to the frame 44 while the rotary wiper arm of the resistor is secured to the shaft 58. Rotation of the shaft 58 will thereupon produce a change in the value of resistance of the resistor 62.

A suitable cable 64 is secured at one end of the auxiliary piston 28 and passes around two suitable idler pulleys 66 and 68 to be wound on the larger drum 60.

Two wires 70 and 72 are connected to the potentiometer 662, the wire 70 being connected to the wiper arm and the wire 72 being connected to the stator. A suitable voltmeter 74 and battery 76 are also connected in series with the wire 72 for measuring the value of resistance of the potentiometer 62. Thus, as the shaft 58 is moving, the wiper arm in the potentiometer is moved, which in turn causes a movement of the pointer in the meter 74.

In operation, the machine 10 is moved unidirectionally through the pipeline 12 until a joint is located. The method and apparatus for locating the joint is disclosed in the aforementioned Cook et al. application. The applicator blades mounted on the distal end of the tubular post 32 are then positioned in registry with the joint and air pressure is then admitted to the chamber 40 via the inlet line 42. The two pistons 24 and 28 are driven forwardly under the force of this air pressure, thereby discharging the plastic material of suitable chemical composition through the post 32 and conduit 34. The discharge ends of this post 32 and conduit 34 are positioned in registry with the blades so that the material will be deposited in the proximity of the joint.

As the pistons 24 and 28 move forwardly in the direction of the arrow F, the cable 64 is correspondingly moved and unwound from the larger drum 60. This unwinding action causes rotary movement of the smaller drum 54, shaft 58 and wiper arm of the potentiometer 62, the cable 52 being wound to a greater extent on the smaller drum 54, thereby tensioning or loading the spring 48. As the wiper arm of the potentiometer 62 is moved, the value of resistance correspondingly changes, which produces a corresponding change in the reading of the meter 74. Thus, the meter 74 may be calibrated in terms of distance which the piston 24 travels. An observer located at a remote point on the surface 78 of the ground can thereupon operate the air valve feeding air pressure to the chamber 40 to discharge a certain quantity of material from the chamber 36. The operator merely watches the meter 74 and when it registers a given figure, the operator turns off the valve, thereby terminating the discharging action.

Obviously, the meter 74 may be calibrated in terms of quantity of material discharged from the chamber 36, since this quantity is directly related to piston movement.

When a predetermined quantity of the plastic material is discharged into a joint, the air valve is shut off, so that the machine 10 can be moved to the next succeeding joint at which the coating operation is repeated.

When the supply of material in the chamber 36 is exhausted, the machine 10 is withdrawn from the main 12 and the piston 24 is retracted by communicating a sub-atmospheric pressure to the chamber 40 or a super-atmospheric pressure to the chamber 36. As the piston 24 retracts, the tension spring 48 rotates the rotor assembly 56 correspondingly, so that for fully retracted position the potentiometer 62 is returned to its starting position. Thus, one complete revolution of the wiper arm of the potentiometer will correspond to a complete cycle of protractile movement of the piston 24.

What is claimed is:

1. A mechanism of the character described comprising a cylinder having a movable wall therein controllable for discharging a desired quantity of plastic material, a first drum operatively connected to said movable wall and correspondingly rotatable in response to movement thereof, a second drum mounted for rotation with said first drum, a spring operatively connected to said second drum for yieldably urging the first drum to retracted position, a variable impedance mounted for movement by said second drum and variable in response to rotation of said first drum and electrical means for indicating variation of said impedance.

2. Apparatus for measuring material comprising a container for storing a quantity of said material, a movable member operatively associated with said container and controllable for forceably discharging said material, an electrical signalling circuit including means operatively coupled to said movable member for producing an electrical signal the character of which may be continuously varied in direct relation to progressive movement of said movable member, and a remote indicator coupled to said circuit and responsive to said signal for producing readings correlated with said progressive movement and continuously indicative of the quantity of material being discharged.

3. Apparatus for measuring material comprising a cylindrical container for storing a quantity of said material, a movable wall in said container and controllable for discharging a desired quantity of said material, an electrical signalling circuit including a variable impedance operatively coupled to said movable wall, movement of said wall causing variation of said impedance in direct proportion to the degree of said movement thereby to generate in said electrical circuit a signal the character of which continuously varies in direct proportion to the degree of movement of said wall, and means electrically coupled to said circuit and responsive to said signal for continually indicating the quantity of material displaced by said movable wall.

4. Apparatus for measuring material comprising a cylindrical container for storing a quantity of said material, a movable wall in said container and controllable for discharging a desired quantity of said material, an electrical signalling circuit including a potentiometer having a wiper arm, means connected to said movable wall for adjusting said wiper arm in direct proportion to the degree of movement of said wall thereby to generate in said electrical circuit a signal the character of which continuously varies in direct proportion to the degree of movement of said wall, and means electrically coupled to said circuit and responsive to said signal for continually indicating the quantity of material displaced by said movable wall.

References Cited in the file of this patent

UNITED STATES PATENTS

| | | |
|---|---|---|
| 827,182 | Rittmeyer | July 31, 1906 |
| 1,177,423 | La Rue | Mar. 28, 1916 |
| 1,539,071 | Callahan et al. | May 26, 1925 |
| 2,315,162 | Rasmussen | Mar. 30, 1943 |
| 2,446,657 | MacLeod et al. | Aug. 10, 1948 |
| 2,595,425 | Thompson et al. | May 6, 1952 |
| 2,604,230 | Payne | July 22, 1952 |
| 2,604,779 | Purcell | July 29, 1952 |